A. D. WRIGHT.
VALVE.
APPLICATION FILED JULY 17, 1914.

1,175,328.

Patented Mar. 14, 1916.
2 SHEETS—SHEET 1.

Witnesses
Carroll Bailey.
Wm. H. Downing.

Inventor
Albert D. Wright,
By Richard B. Owen.
Attorney

A. D. WRIGHT.
VALVE.
APPLICATION FILED JULY 17, 1914.

1,175,328.

Patented Mar. 14, 1916.
2 SHEETS—SHEET 2.

Witnesses
Carroll Bailey
Wm. H. Downing

Inventor
Albert D. Wright,
By Richard B. Owen.
Attorney

UNITED STATES PATENT OFFICE.

ALBERT D. WRIGHT, OF OIL CITY, PENNSYLVANIA, ASSIGNOR OF ONE-HALF TO HIRAM T. ROSE, JR., OF ROUSEVILLE, PENNSYLVANIA.

VALVE.

1,175,328. Specification of Letters Patent. Patented Mar. 14, 1916.

Application filed July 17, 1914. Serial No. 851,563.

*To all whom it may concern:*

Be it known that I, ALBERT D. WRIGHT, a citizen of the United States, residing at Oil City, in the county of Venango and State of Pennsylvania, have invented certain new and useful Improvements in Valves, of which the following is a specification.

My invention relates to valves and more particularly to a combined stop and check valve.

The primary object of my invention resides in the provision of a novel means for removably and rotatably mounting a stop, the latter having a novel check valve associated therewith for controlling the supply of liquid through the pipe, the stop and check valve being so arranged that they may be connected by one operation thus overcoming the inconvenience of separate connections of these parts.

Another object of my invention resides in the provision of a novel means removably associated with the casing for facilitating access to the check valve for either removing the same or for cleaning purposes.

A still further object of my invention resides in the provision of an improved means for supporting and holding the stop in a set position the latter because of its mounting being turnable and allowing the operation of the valve in either direction of the casing.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

Figure 1:
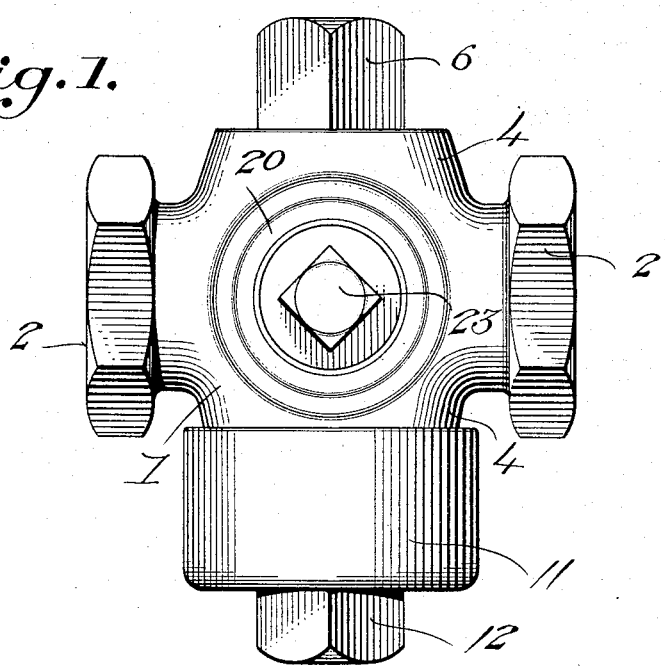
Figure 2:
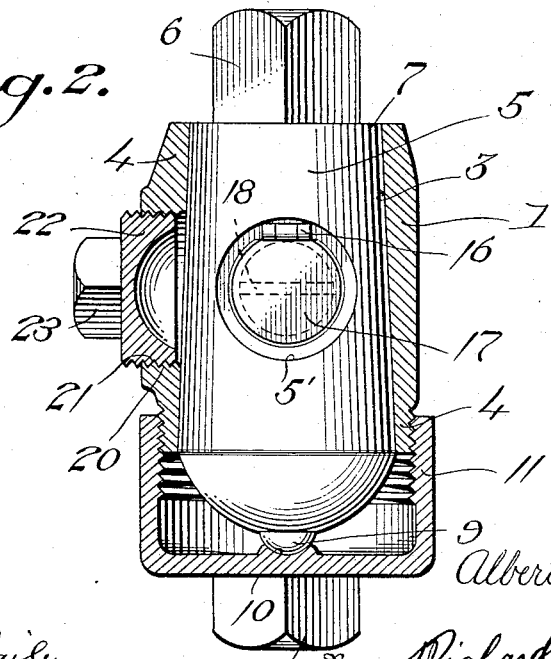
Figure 5:
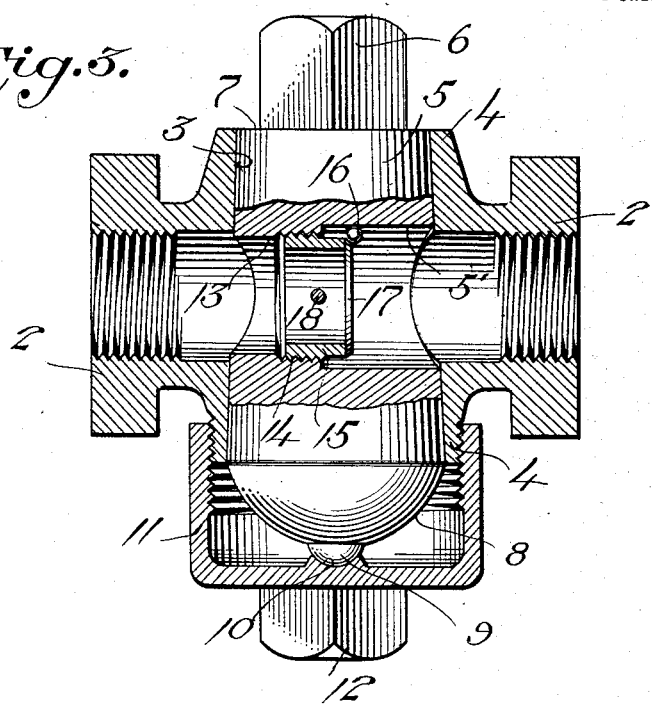
Figure 4:
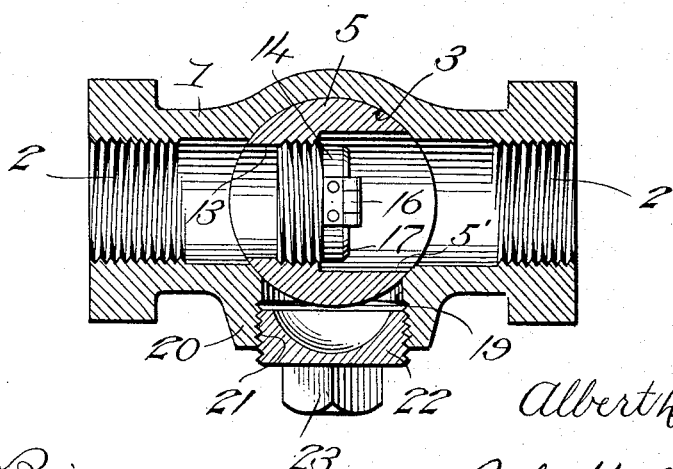

In the drawings:—Figure 1 is a side elevational view of my invention. Fig. 2 is a transverse sectional view of my invention showing the plug in elevation. Fig. 3 is a longitudinal sectional view of my invention showing the plug partly broken away in order to set forth the construction and arrangement of the check valve. Fig. 4 is a longitudinal sectional view looking down on the invention.

Referring more particularly to the drawings in which similar reference numerals designate like or corresponding parts throughout the different views, I provide a valve casing 1 having connections 2 on the outer ends thereof. I further provide the casing with a transversely extending opening 3 the latter being slightly tapered and which casing has projecting about the sides of the opening annular collars 4 through which opening and collars 4 is removably and rotatably mounted my improved tapering stop 5 having a transverse bore 5' extending therethrough approximately intermediate its ends. The upper end of said stop is reduced to provide a square head 6 for facilitating the rotation of the same by the use of a suitable tool, not shown, the shoulder 7 formed when providing the head being arranged in alinement with the upper edge of the upper collar to allow the free engagement with the head. The lower end of the stop is rounded as at 8 the lower end of the rounded portion being normally positioned a slight distance beneath the lower edge of the lower collar 4 and terminating in a centrally disposed rounded head 9 the latter being arranged in engagement with a complemental socket 10 centrally disposed in the bottom of an annular cap 11. This cap is screw threaded on its inner periphery and removably and adjustably engaged on the exterior screw threads on the lower end of the lower collar 4 thus serving to support the stop within the casing 2. Said cap is further provided on its lower surface with a centrally disposed square head 12 the latter being engageable by a suitable tool, not shown, for facilitating the turning of the cap. By this arrangement it can be seen that when the stop 4 is adjusted to facilitate communication between pipes (not shown) adapted for engagement with the connections 2 the cap can be adjusted and because of the frictional engagement of the socket 10 with the head 9 accidental turning movement of the stop is prevented.

For the purpose of controlling the supply of liquid or the like through the valve casing 2 I have removably secured in the smaller portion 13 of the bore 5', preferably by means of screw threads 14 an exteriorly screw threaded annular seat 15 the latter extending slightly into the enlarged portion of the bore 5' and has hinged as at 16 to a portion of the outer periphery thereof a check valve 17 the latter having its outer edge beveled and arranged in circumferential alinement with the outer edge of the annular seat 15. The bore 5′ being arranged, at times, in substantial alinement with the way in the casing allows liquid or the like to pass from one end of the casing to the other and when a sufficient quantity has been passed through the valve casing the check valve 17 will drop toward the opening. It is obvious that from the arrangement of the cap 11 coacting with the stop that the same can be rotated and allow the liquid to pass through from either end of the casing. In order to prevent the passage of any large objects through the bore 5′ when the valve is in its open position I have provided a pin 18 and extended the same transversely across the valve seat at diametrically opposite points as clearly shown in the drawings.

For the purpose of gaining access to the valve seat 14 and valve 17 for cleaning purposes or to replace the valve 17, I have provided a casing with a laterally extending opening with respect to the positioning of the stop 5, the opening 19 being slightly larger than and registrable at times with the bore 5′ the casing being provided with a lateral extending annular collar 20 the latter being arranged about the opening 19 and screw threaded as at 21 on its inner periphery to receive an annular plug 22. The plug 22 is provided on its outer periphery with screw threads for engagement with the screw threads 21 for removably holding the same in engagement with the opening and collar and is reduced on its outer end to provide a squared head 23 the latter being engageable with a suitable tool, not shown, for facilitating the removal of the plug. By this arrangement it is obvious that by adjusting the plug to one side the main fluid in the pipe line can be easily drained therefrom and thus prevent the pipe line and valve from freezing and bursting should the fluid have remained therein.

Although I have shown and described the preferred embodiment of my invention I desire to be understood that I am not limited to the exact details shown, however, I desire that great stress be laid upon the arrangement of the stop having the check valve removably mounted in the bore thereof and the novel means in the form of the plug associated with the valve casing for facilitating access to the valve for various purposes.

From the above description taken in connection with the accompanying drawings it can easily be seen that I have provided a device that is simple in construction containing but a few simple parts that can be cheaply manufactured and assembled and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. A valve including a casing having an opening therethrough, collars formed about the respective ends of the opening, the inner periphery of said opening and the collars being tapered, a tapered plug rotatably and removably mounted in said opening, said plug provided with a bore, a squared head formed upon the upper head of said plug for facilitating the rotation of the plug, a rounded head formed upon the lower end of the plug, and a cap removably secured to the lower of said collars and having a socket therein for frictional engagement with the rounded head of the plug.

2. A valve including a casing having an opening therethrough, collars formed about the respective ends of the opening the inner periphery of said opening and collars being tapered, a tapered plug rotatably and removably mounted in said opening said plug provided with a bore, a squared head formed upon the upper end of said plug for facilitating the rotation of the plug, a rounded head formed upon the lower end of the plug, a cap removably secured about the lower of said collars and having a socket therein for frictional engagement with the rounded head of said plug, means for facilitating rotation of the cap, a valve seat removably mounted in the bore, a valve pivotally mounted on the seat for controlling the passage of liquid through the bore, means for guarding the valve, said casing provided with a laterally extending opening with respect to the position of the plug and a plug removably associated with said opening for facilitating access to said valve for various purposes.

In testimony whereof I affix my signature in presence of two witnesses.

ALBERT D. WRIGHT.

Witnesses:
KATHRYN L. MYERS,
W. E. SISSON.

Copies of this patent may be obtained for five cents each, by addressing the "Commissioner of Patents, Washington, D. C."